(12) United States Patent
Christoffel

(10) Patent No.: US 7,047,871 B1
(45) Date of Patent: May 23, 2006

(54) ELECTRIC TOASTER WITH EXPANDING TRAY WALLS

(76) Inventor: Brett M Christoffel, 3540 Leathertop Dr., Plano, TX (US) 75075

( * ) Notice: Subject to any disclaimer, the term of this patent is extended or adjusted under 35 U.S.C. 154(b) by 0 days.

(21) Appl. No.: 10/972,927

(22) Filed: Oct. 25, 2004

(51) Int. Cl.
*A47J 37/08* (2006.01)

(52) U.S. Cl. .................. 99/327; 99/329 RT; 99/331; 99/385; 99/389; 99/391

(58) Field of Classification Search .......... 99/326–333, 99/339, 340, 341, 385, 386, 388, 389–391, 99/392, 393; 219/521–525, 492, 400, 494, 219/386; 426/523
See application file for complete search history.

(56) References Cited

U.S. PATENT DOCUMENTS

| | | | | |
|---|---|---|---|---|
| 4,656,927 | A * | 4/1987 | Mosby et al. ................ | 99/388 |
| 4,745,855 | A * | 5/1988 | Younger ..................... | 99/391 |
| 4,972,768 | A * | 11/1990 | Basora San Juan ........... | 99/391 |
| 5,590,584 | A * | 1/1997 | Ahn ............................ | 99/327 |
| 5,664,483 | A * | 9/1997 | Yip ............................. | 99/391 |
| 5,853,781 | A * | 12/1998 | Bono et al. ................. | 426/110 |
| 5,943,948 | A * | 8/1999 | Tanaka ....................... | 99/388 |
| 6,112,648 | A * | 9/2000 | Origane ...................... | 99/388 |
| 6,546,844 | B1* | 4/2003 | Trevino ...................... | 99/327 |
| 6,730,888 | B1* | 5/2004 | Battu ......................... | 219/502 |
| 6,799,505 | B1* | 10/2004 | Mauffrey .................... | 99/385 |
| 6,829,983 | B1* | 12/2004 | Arnedo et al. .............. | 99/327 |
| 6,868,775 | B1* | 3/2005 | Chen .......................... | 99/327 |

\* cited by examiner

*Primary Examiner*—Timothy F. Simone
(74) *Attorney, Agent, or Firm*—Michael I. Kroll

(57) ABSTRACT

Apparatus 10 for a toaster appliance having at least one circular-like carriage 14 forming a support element for food articles 12 such as tortillas, pita, naan and other flatbreads during a warming/toasting session. The support walls 16, 20 are comprised of wire mesh 18 with one side having a partial lower peripheral rim or lip 38 positioned flange extending thereinbetween acting as a carriage for the food article. Diametrically opposed is the other support wall that is spaced over the depending flange 38 extending from the other wall. Adjacent coplanar posts or pins 36 extend from the mesh-walls 16, 20 traveling in and through guide tracks 40 located at each end of the interior housing 24 with tensioning members 34 fastened to the post distal ends keeping the support walls compressed. One of the tracks 40 is of greater width thereby providing for variable thickness of the food article, which is held by the tensioned mesh walls 16, 20. One rail of the interiorly positioned track 40 is substantially vertical while the other is angularly divergent so that when the tray is in the food article receiving position, the walls 16, 20 are spaced apart providing means for inserting and removing food articles 12 without engaging the mesh-like walls.

10 Claims, 9 Drawing Sheets

ELECTRIC TOASTER WITH EXPANDING TRAY WALLS

BACKGROUND OF THE INVENTION

1. Field of the Invention

The present invention relates generally to electric toasters and, more specifically, to a toaster appliances having at least one circular-like carriage forming a support element for food articles such as tortillas, pita, naan and other flatbreads during a warming/toasting session.

The support walls are comprised of wire mesh with one side having a partial peripheral rim positioned flange extending therefrom acting as a carriage for the food article. Diametrically opposed is the other support wall that is spaced over the depending flange extending from the other.

Adjacent coplanar posts extend from the mesh-walls traveling in and through tracks located at each end of the interior housing with tensioning members fastened to the post distal ends keeping the support walls compressed. One of the tracks is of greater width thereby providing for variable thickness of the food article, which is held by the tensioned mesh walls.

One rail of the interiorly positioned track is substantially vertical while the other is angularly divergent so that when the tray is in the food article receiving position, the walls are spaced apart providing means for inserting and removing food articles without engaging the mesh-walls. As the tray is moved to the operative toasting position, the tracks and resident posts bring the walls into a substantially parallel relationship.

2. Description of the Prior Art

There are other toaster devices designed for toasting food articles. While these devices may be suitable for the purposes for which they where designed, they would not be as suitable for the purposes of the present invention as heretofore described.

It is thus desirable to provide a carriage for a toaster having mesh-like walls for containing food articles therein thereby preventing the food article from contacting the heating element within the toaster.

It is further desirable to provide a carriage for food articles wherein one of said mesh-walls moves to a position creating a larger food article receiving aperture to prevent contact with the carriage elements while inserting and removing the food article therefrom.

SUMMARY OF THE PRESENT INVENTION

The present invention discloses a toaster appliance having at least one circular-like carriage forming a support element for food articles such as tortillas, pita, naan and other flatbreads during a warming/toasting session. The support walls are comprised of wire mesh with one side having a partial lower peripheral rim or lip positioned flange extending therefrom acting as a carriage for the food article. Diametrically opposed is the other support wall that is spaced over the depending flange extending from the other wall. Adjacent coplanar posts or pins extend from the mesh-walls traveling in and through guide tracks located at each end of the interior housing with tensioning members fastened to the post distal ends keeping the support walls compressed. One of the tracks is of greater width thereby providing for variable thickness of the food article, which is held by the tensioned mesh walls. One rail of the interiorly positioned track is substantially vertical while the other is angularly divergent so that when the tray is in the food article receiving position, the walls are spaced apart providing means for inserting and removing food articles without engaging the mesh-like walls.

A primary object of the present invention is to provide a toaster carriage for food articles such as tortillas, pita, naan and other flatbreads.

Another object of the present invention is to provide a toaster carriage having spaced apart mesh-like walls for containing the food article therein.

Yet another object of the present invention is to provide a toaster carriage wherein one of said mesh-walls has a depending rim positioned flange extending therefrom serving as support for the food article.

Still yet another object of the present invention is to provide a toaster carriage wherein said food article support is peripherally positioned extending substantially from one side of the carriage to the other.

Another object of the present invention is to provide a toaster carriage wherein the base of one of said mesh-walls is spaced over the depending flange extending from the other.

Yet another object of the present invention is to provide a toaster carriage having tensioning members positioned on the periphery to keep the mesh-walls in a compressed relation.

Another object of the present invention is to provide a toaster carriage wherein both of the mesh-walls have opposing coplanar posts projecting therefrom.

Yet another object of the present invention is to provide a toaster carriage wherein said posts form anchors for the tensing members positioned therebetween.

Still yet another object of the present invention is to provide a toaster carriage having end plates with tracks positioned therein.

Another object of the present invention is to provide a toaster carriage wherein one of said tracks provides means wherein the relationship between the walls can increase to accommodate thicker food articles.

Yet another object of the present invention is to provide a toaster carriage wherein said posts extend through said tracks having said tensioning members fastened towards the post ends.

Still yet another object of the present invention is to provide a toaster carriage wherein the mesh-walls converge into a substantially parallel position when the carriage is moved to a toasting position.

Another object of the present invention is to provide a toaster carriage wherein the mesh-walls diverge from one another as the carriage is moved to a food article receiving/dispensing position.

Yet another object of the present invention is to provide a toaster carriage wherein the receiving aperture is enlarged whereby food articles can be easily inserted and removed without coming into contact with the carriage elements.

Additional objects of the present invention will appear as the description proceeds.

The present invention overcomes the shortcomings of the prior art by providing a toaster carriage comprised of movable tray support walls forming a support element for food articles such as tortillas, pita, naan and other flatbreads.

The support walls are comprised of wire mesh with one side having a partial peripheral rim positioned flange extending therefrom acting as a carriage for the food article. Diametrically opposed is the other support wall.

Located between the opposing mesh-wall supports are a plurality of tensioning members peripherally positioned maintaining the mesh-walls in a spaced relationship. Adjacent coplanar posts extend from the mesh-walls traveling in tracks located at each end of the interior housing with the tensioning members fastened therebetween.

One rail of the interiorly positioned track is substantially vertical while the other is angularly divergent so that when the tray is in the food article receiving position, the walls are spaced apart providing means for inserting and removing food articles without engaging the mesh-walls. As the tray is moved to the operative toasting position, the tracks and resident posts bring the walls into a substantially parallel relationship.

The foregoing and other objects and advantages will appear from the description to follow. In the description reference is made to the accompanying drawings, which form a part hereof, and in which is shown by way of illustration-specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
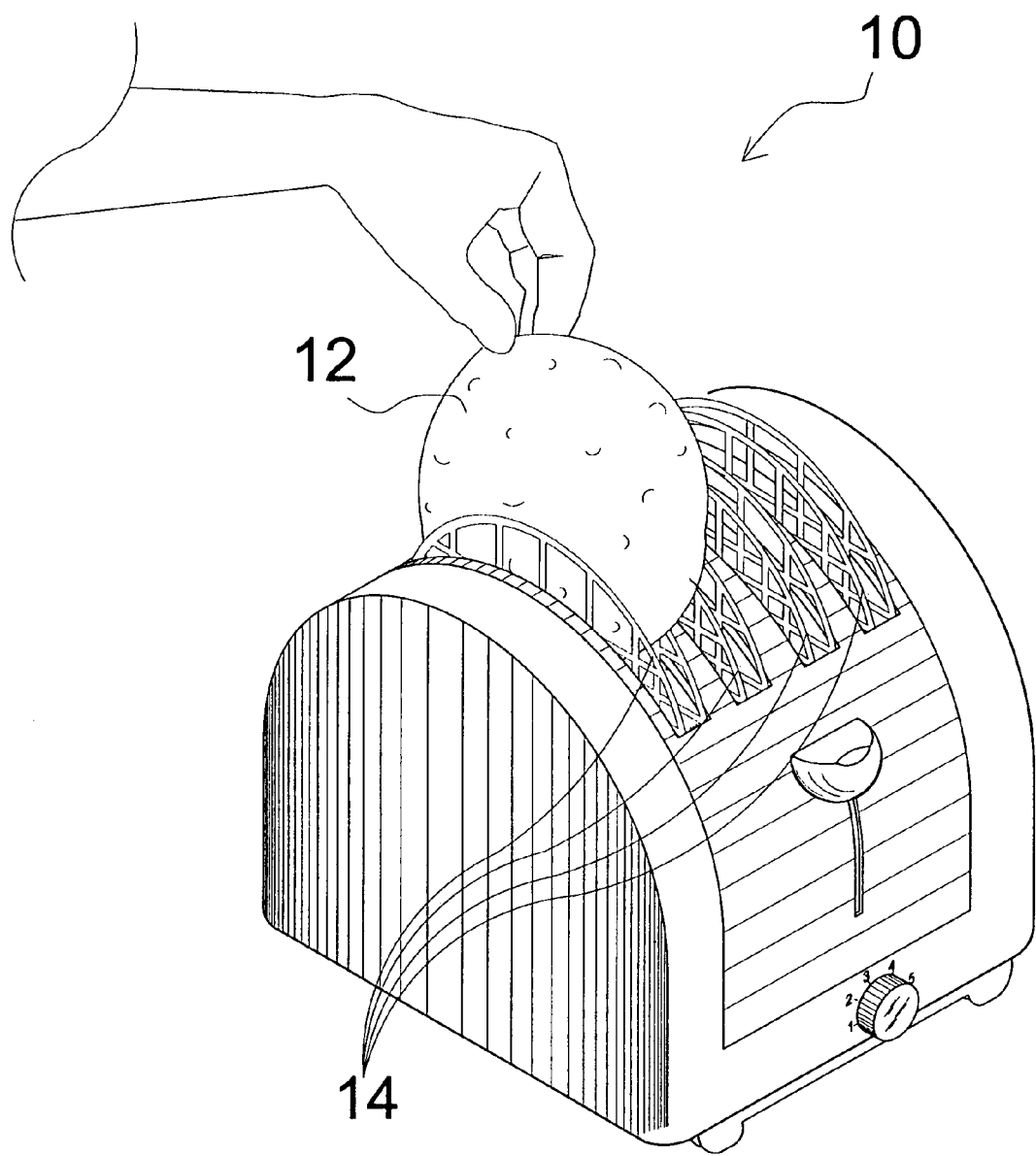
FIG. 1 is an illustrative view of the present invention in use.

With regard to reference numerals used, the following numbering is used throughout the drawings.

10 present invention
12 food item
14 cage/carriage
16 first wall
18 bars
20 second wall
22 heater elements
24 housing
26 handle
28 down position
30 timer
32 up position
34 springs
36 pins/posts
38 lip/bottom
40 track guide
42 compressed springs
44 guide plate

DETAILED DESCRIPTION OF THE PREFERRED EMBODIMENT

The following discussion describes in detail one embodiment of the invention (and several variations of that embodiment. This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention 10 discloses a tortilla warmer/toaster appliance for warming one or more tortillas 12 or other food item comprising a push down pop up tortilla-holding cage 14 that rises and falls with the tortilla within. The holding cage 14 has a pair of rib-like structures coupled by springs to keep a thin corn/flour tortilla 12 snug and also accommodate a pita or other round flatbread. The device 10 also provides toasting/warming selections, a variable resister, duel or four slots and a crumb tray.

Figure 2:
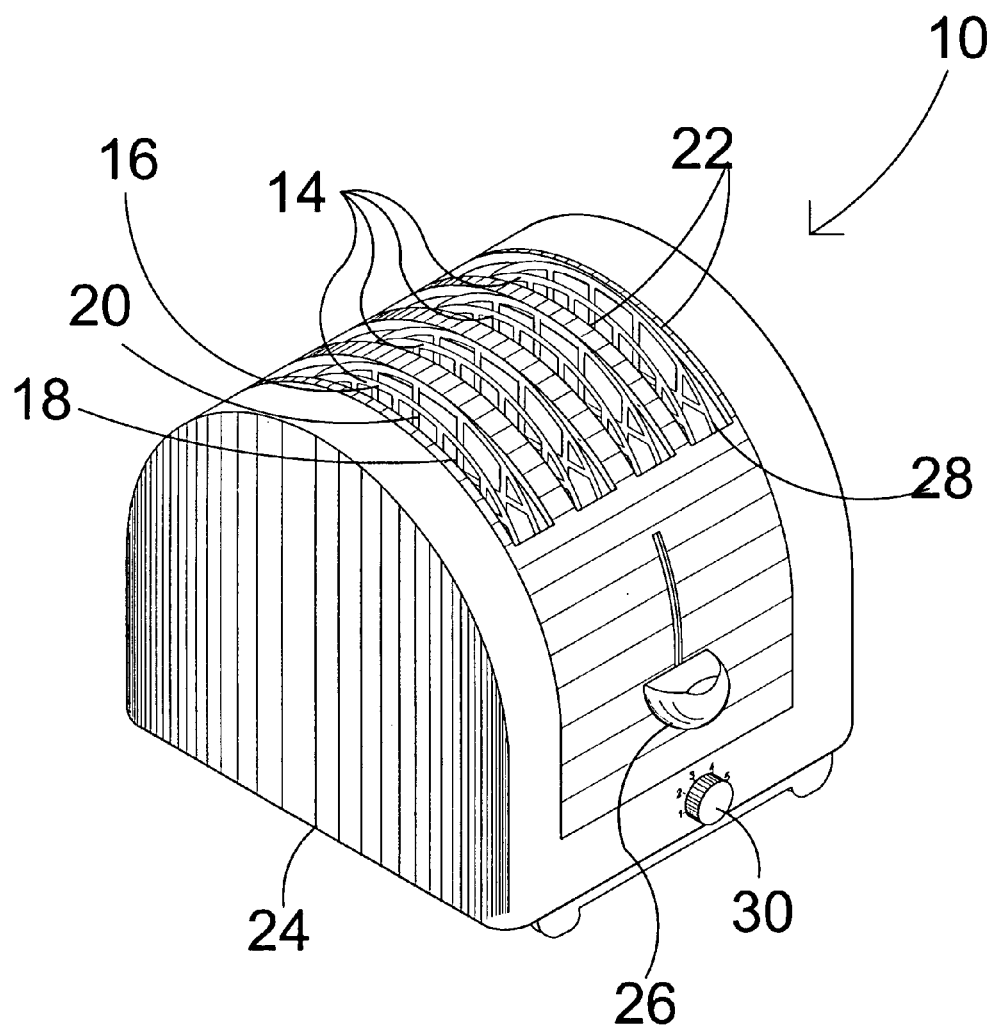
FIG. 2 is a frontal perspective view of the present invention.

Turning to FIG. 2, shown therein is a frontal perspective view of the present invention 10. Shown is the present invention 10 disclosing a tortilla warmer/toaster appliance for warming one or more tortillas comprising a push down pop up tortilla-holding cage 14 that rises and falls with the tortilla within. The holding cage 14 has a front tortilla cage wall 16 which includes a plurality of parallel spaced bars 18 and a back cage wall 20 also having a plurality of parallel spaced bars 18 which are offset from the front cage wall and coupled together by springs to keep a thin corn/flour tortilla snug and also accommodate a pita or other round flatbread. The device 10 also provides toasting/warming selections, a variable resister, four slots or dual, a plurality of heater element walls juxtaposed to the opposing tortilla cage walls having a plurality of heater elements 22 affixed thereto and a crumb tray. Also shown are housing 24, push-down, pop-up handle 26 in the down position at 28 and timer 30.

Figure 3:
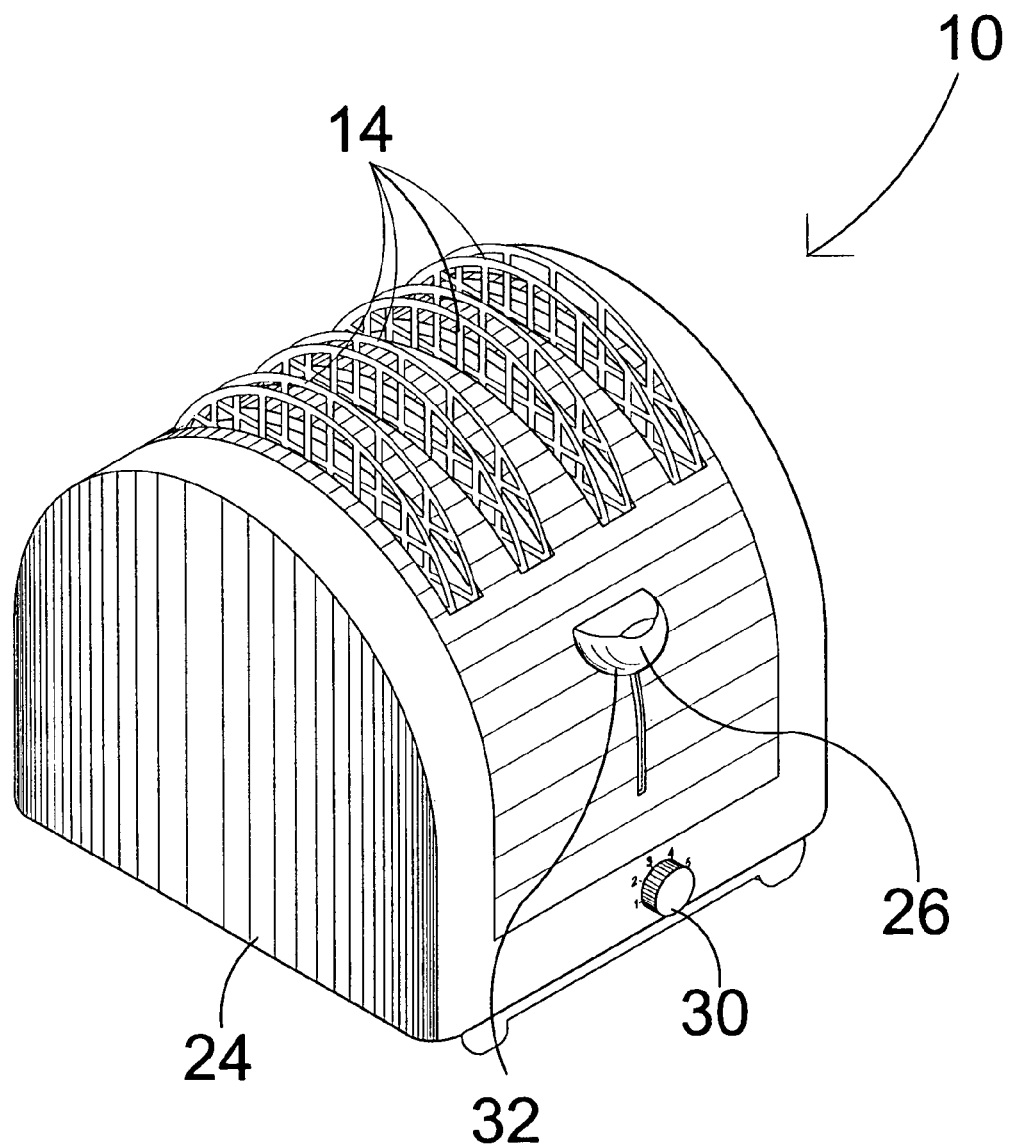
FIG. 3 is a perspective view of the present invention with the cage in the up position.

Turning to FIG. 3, shown therein is a perspective view of the present invention 10 with the cage 14 in the up position. Shown is the present invention 10 disclosing a tortilla warmer/toaster appliance for warming one or more tortillas comprising a push-down, pop-up tortilla-holding cage 14 that rises and falls with the tortilla within. The holding cage 14 has a front tortilla cage wall includes a plurality of parallel spaced bars and a back cage wall having a plurality of parallel spaced bars which are offset from the front cage wall and coupled together by springs to keep a thin corn/flour tortilla snug and also accommodate a pita or other round flatbread. The device 10 also provides toasting/warming selections, a variable resister, four slots or dual, a plurality of heater element walls juxtaposed to the opposing tortilla cage walls having a plurality of heater elements affixed thereto and a crumb tray. Also shown are housing 24, push-down, pop-up handle 26 in the up position at 32 and timer 30.

Figure 4:
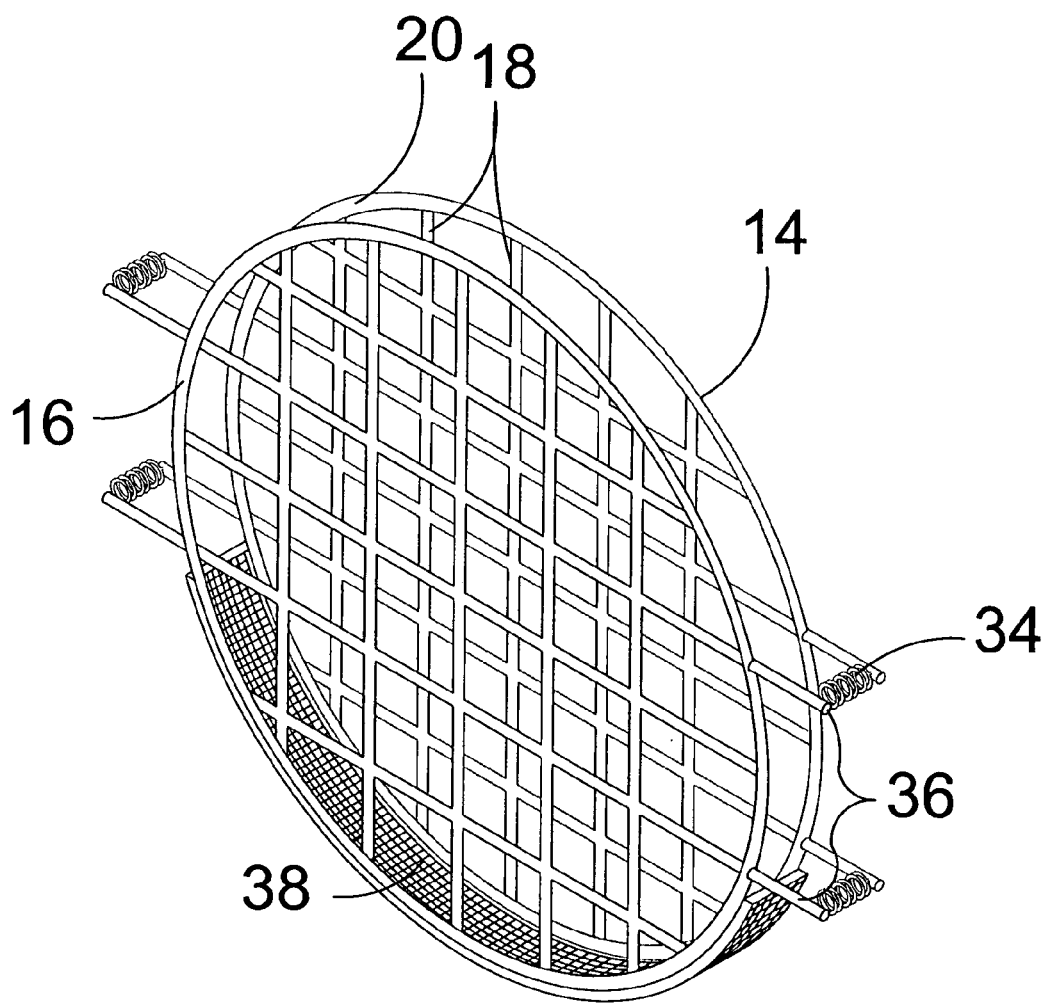
FIG. 4 is a detailed view of the cage of the present invention.

Turning to FIG. 4, shown therein is a detailed view of the cage 14 of the present invention. Shown is the present invention disclosing a tortilla warmer/toaster appliance for warming one or more tortillas comprising a push down pop up tortilla-holding cage 14 that rises and falls with the tortilla within. The holding cage 14 has a front tortilla cage wall 16 which includes a plurality of parallel spaced bars 18 and a back cage wall 20 having a plurality of parallel spaced bars which are offset from the front cage wall having a lower lip 38 in between and coupled together by springs 34 mounted on pins 36 to keep a thin corn/flour tortilla snug and also accommodate a pita or other round flatbread. The device also provides toasting/warming selections, a variable resister, four slots or dual, a plurality of heater element walls juxtaposed to the opposing tortilla cage walls having a plurality of heater elements affixed thereto and a crumb tray.

Figure 5:
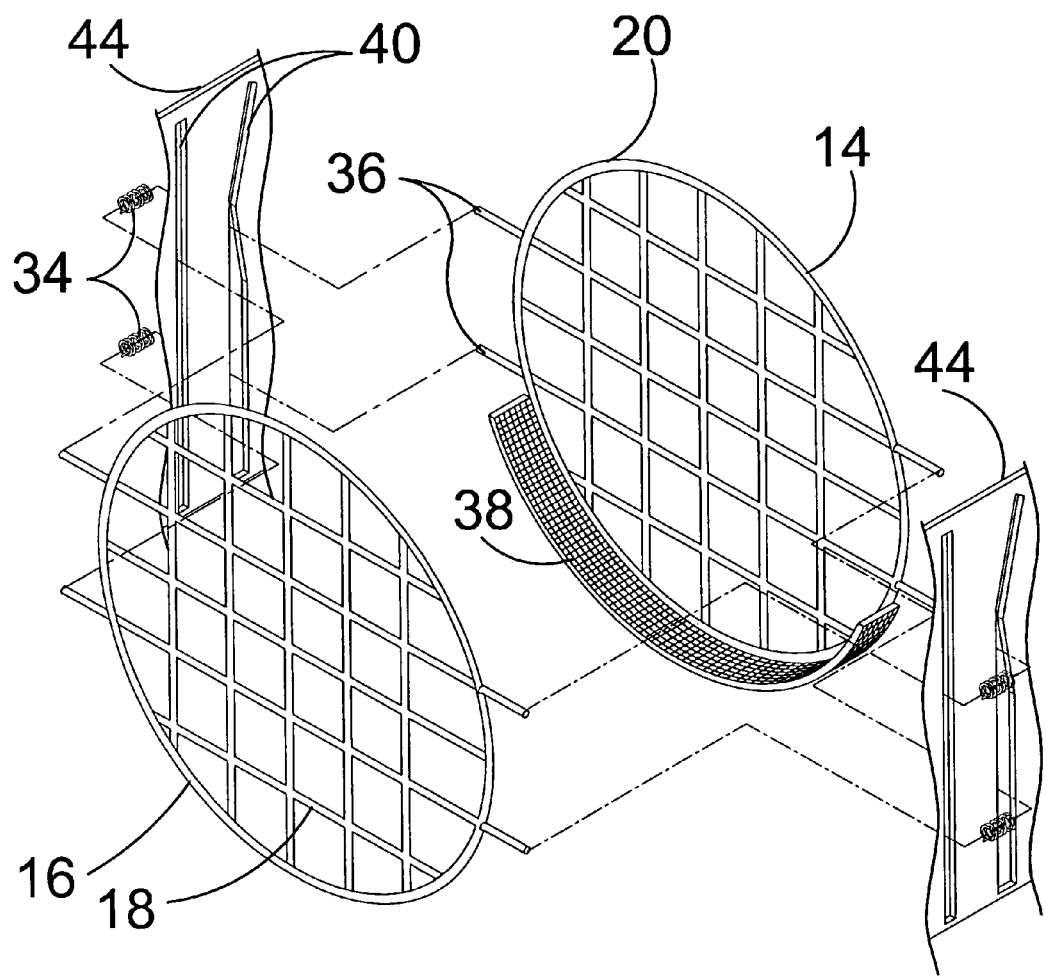
FIG. 5 is an exploded view the cage of the present invention.

Turning to FIG. 5, shown therein is an exploded view the cage 14 of the present invention. Shown is the present invention 10 disclosing a tortilla warmer/toaster appliance for warming one or more tortillas comprising a push down pop up tortilla-holding cage 14 that rises and falls with the tortilla within. The holding cage 14 having a front tortilla cage wall 16 includes a plurality of parallel spaced bars 18 and a back cage wall 20 having a plurality of parallel spaced bars which are offset from the front cage wall and coupled together by springs 34 to keep a thin corn/flour tortilla snug and also accommodate a pita or other round flatbread. The device 10 also provides toasting/warming selections, a variable resister, four slots or dual, a plurality of heater element walls juxtaposed to the opposing tortilla cage walls having a plurality of heater elements affixed thereto and a crumb tray. Also shown are lip 38, pins 36, guide plates 44 having slots or guide tracks 40 therein.

Figure 6:
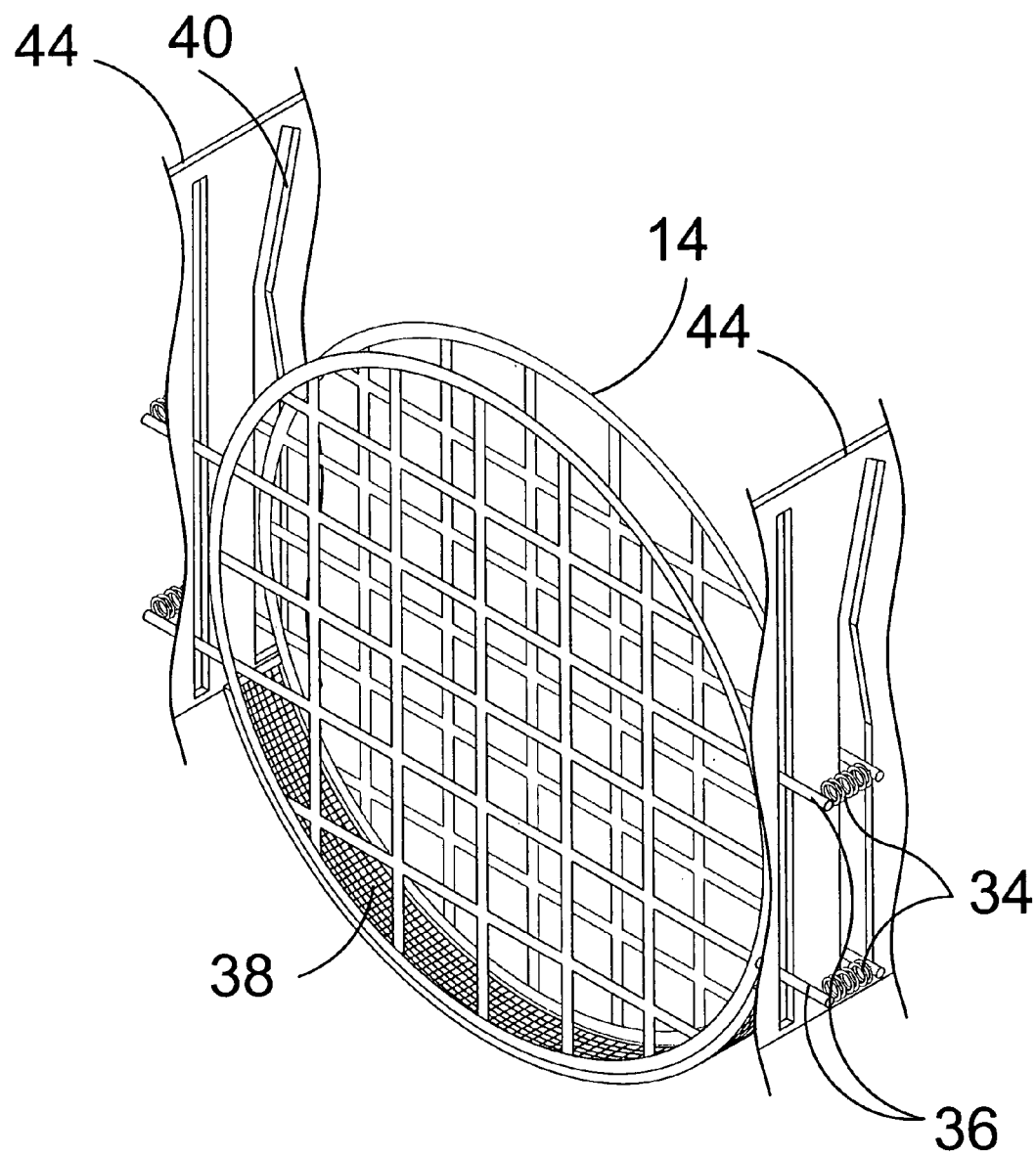
FIG. 6 is an assembled view of the cage and guides of the present invention.

Turning to FIG. 6, shown therein is an assembled view of the cage and guides of the present invention. Shown is the present invention disclosing a tortilla warmer/toaster appliance for warming one or more tortillas comprising a push down pop up tortilla-holding cage 14 that rises and falls with the tortilla within. The holding cage 14 has a front tortilla cage wall includes a plurality of parallel spaced bars and a back cage wall having a plurality of parallel spaced bars which are offset from the front cage wall having a lower lip 38 and coupled together by springs 34 to keep a thin corn/flour tortilla snug and also accommodate a pita or other round flatbread. The device also provides toasting/warming selections, a variable resister, four slots or dual, a plurality of heater element walls juxtaposed to the opposing tortilla cage walls having a plurality of heater elements affixed thereto and a crumb tray. Also shown are pins 36, guide plates 44 and track guide 40.

Figure 7:
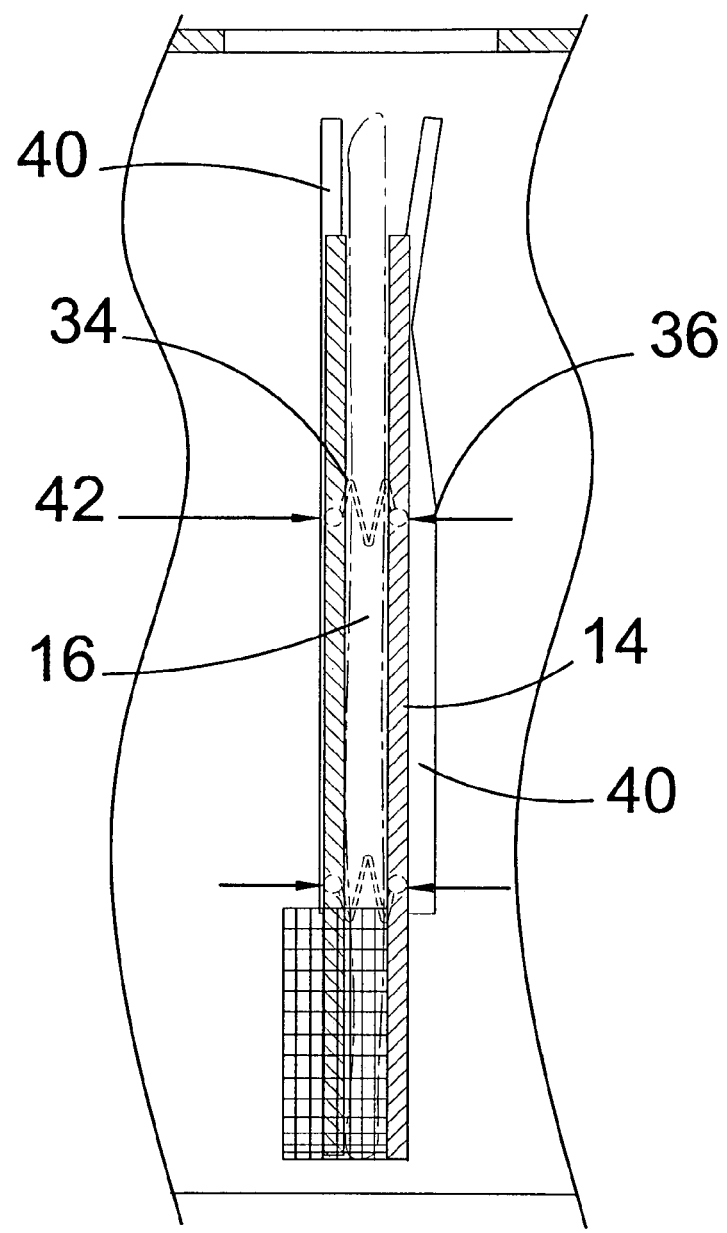
FIG. 7 is a sectional view of the present invention.

Turning to FIG. 7, shown therein is a sectional view of the present invention. Shown is the present invention 10 with springs 34 compressed at 42 disclosing a tortilla warmer/toaster appliance for warming one or more tortillas comprising a push-down, pop-up, tortilla-holding cage 14 that rises and falls with the tortilla or thin food item 16 within. The holding cage 14 has a front tortilla cage wall includes a plurality of parallel spaced bars and a back cage wall having a plurality of parallel spaced bars which are offset from the front cage wall and coupled together by springs 34 on pins 36 to keep a thin corn/flour tortilla snug and also accommodate a pita or other round flatbread. The device also provides toasting/warming selections, a variable resister, four slots or dual, a plurality of heater element walls juxtaposed to the opposing tortilla cage walls having a plurality of heater elements affixed thereto and a crumb tray. Also shown are a pair of guide tracks 40.

Figure 8:
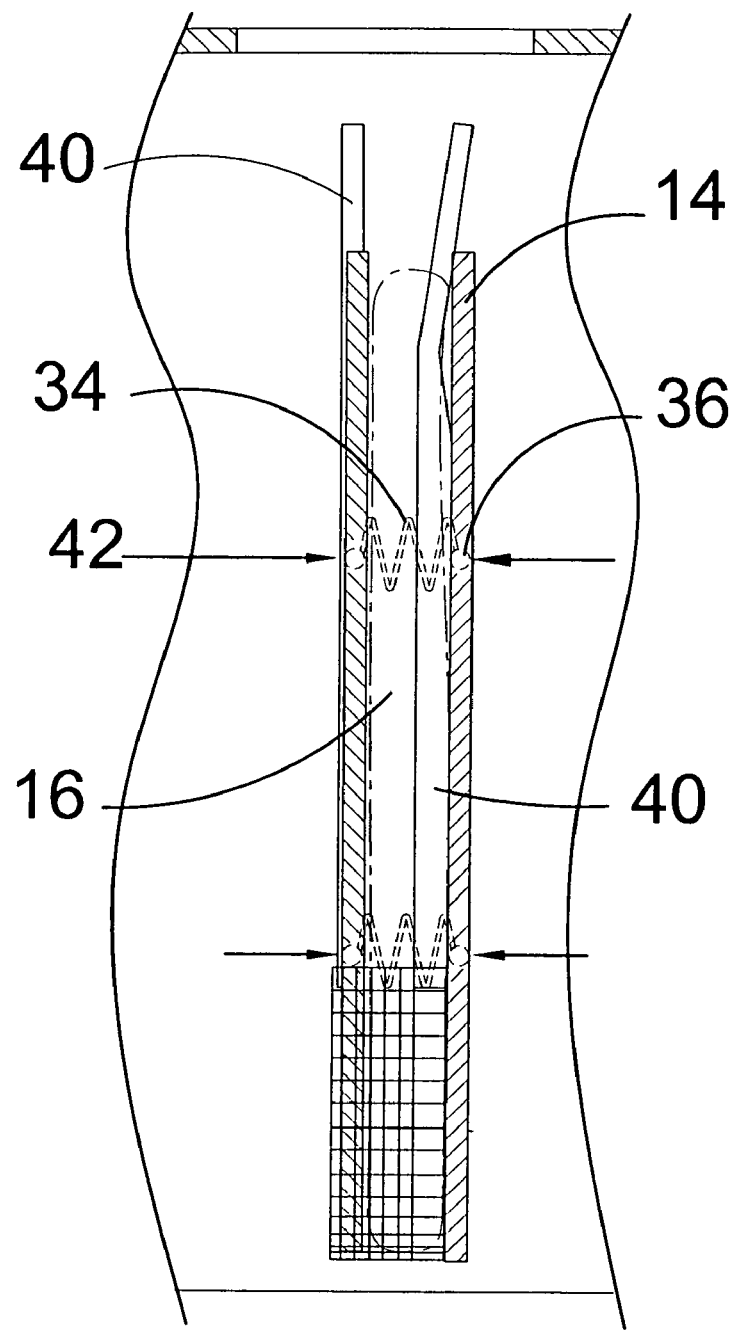
FIG. 8 is a sectional view of the present invention.

Turning to FIG. 8, shown therein is a sectional view of the present invention. Shown is the present invention 10 with springs 34 compressed at 42 disclosing a tortilla warmer/toaster appliance for warming one or more tortillas comprising a push-down, pop-up, tortilla-holding cage 14 that rises and falls with the tortilla or other thick food item 16 within. The holding cage 14 has a front tortilla cage wall includes a plurality of parallel spaced bars and a back cage wall having a plurality of parallel spaced bars which are offset from the front cage wall and coupled together by springs 34 on pins 36 to keep a thin corn/flour tortilla snug and also accommodate a pita or other round flatbread. The device also provides toasting/warming selections, a variable resister, four slots or dual, a plurality of heater element walls juxtaposed to the opposing tortilla cage walls having a plurality of heater elements affixed thereto and a crumb tray. Also shown is guide track 40.

Figure 9:
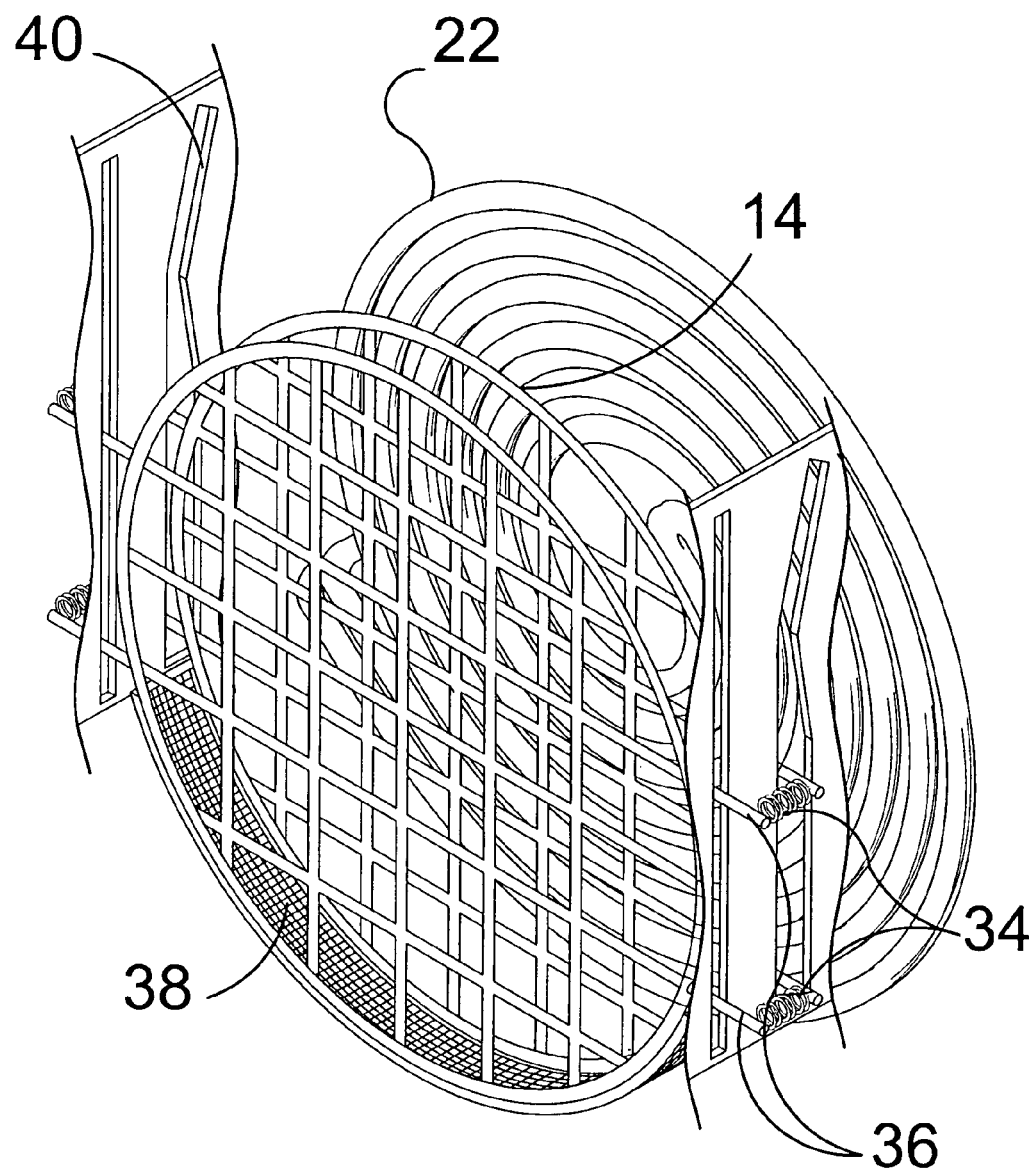
FIG. 9 is an assembled view of the cage and guides of the present invention.

Turning to FIG. 9, shown therein is an assembled view of the cage and guides of the present invention. Shown is the present invention 10 disclosing a tortilla warmer/toaster appliance for warming one or more tortillas comprising a push-down, pop-up, tortilla-holding cage 14 that rises and falls with the tortilla within. The holding cage, having a front tortilla cage wall includes a plurality of parallel spaced bars and a back cage wall having a plurality of parallel spaced bars which are offset from the front cage wall and coupled together by springs 34 on pins 36 to keep a thin corn/flour tortilla snug and also accommodate a pita or other round flatbread. The device also provides toasting/warming selections, a variable resister, four slots or dual, a plurality of heater element walls juxtaposed to the opposing tortilla cage walls having a plurality of heater elements 22 (e.g., a spiral type) affixed thereto and a crumb tray. Also shown are track guide 40 and lip 38.

I claim:

1. An apparatus for an electric toaster for a food item, comprising:
    a) a housing having a top surface, a bottom surface, a front surface, a rear surface and first and second side surfaces for containing the apparatus;
    b) at least one heating element being disposed internal said housing for toasting the food item;
    c) at least one food cage being disposed internal said housing for holding a food item therein proximate to said heating element to permit the food item to become toasted by the heating element, wherein said food cage comprises a first and second parallel vertical wall, each wall having a front and rear end, wherein said walls are made of mesh and are disposed substantially perpendicular to said front and rear surfaces of said housing, wherein said walls are spaced apart for containing the food item therein between, wherein said walls are compressible toward and away from each other having tensioning members disposed thereon so that said walls are biased toward each other to hold the food item therein between, first and second coplanar posts extending substantially horizontally from each of said front and rear ends of each said wall so that said first post is disposed above said second post, wherein each of said posts has an end; and,
    d) a first and second guide plate, each guide plate having first and second slots forming guide tracks therein, wherein each of said first and second guide tracks are vertically disposed, wherein each guide track has an upper end and a lower end, wherein said first and second guide plates are disposed internal said housing on said first and second ends, respectively, of said walls of said food cage so that the ends of said first and second posts of each of said front and rear ends of said walls of said food cage travel up and down in a corresponding guide track of each of said first and second guide tracks of each of said guide plate so that said food cage has an up position wherein the food item can be placed therein and a down position wherein the food item can be disposed proximate to said heating element to permit the food item to be toasted.

2. The apparatus of claim 1, wherein each said food cage is circular in shape having an upper portion and a bottom portion.

3. The apparatus of claim 2, further comprising a bottom lip attached to said bottom portion of said first wall of said food cage and extending perpendicularly from said first wall toward said second wall to permit the food item to rest thereon.

4. The apparatus of claim 3, wherein there are one to four food cages disposed in said housing each having a corresponding heating element for toasting the food item.

5. The apparatus of claim 4, wherein said tensioning members comprise springs having a first end connected to said first wall of each said food cage and a second end connected to said second wall of each said food cage.

6. The apparatus of claim 5, wherein said tensioning members comprise springs having a first end connected to said posts of said first wall of each said food cage and a second end connected to said corresponding post on said second wall of each said food cage.

7. The apparatus of claim 6, wherein one said first and second guide tracks is wider than the other said first and second guide tracks to permit the horizontal distance between said first and second walls of said food cage to vary due to the varying thickness of different food items.

8. The apparatus of claim 7, wherein said upper end of one said first and second guide tracks is angled away from the other said upper end of said first and second guide tracks to permit the horizontal distance between said first and second walls to be increased when said food cage is in said up position to permit the food item to be placed in the food cage.

9. The apparatus of claim 8, further comprising an electric timer for controlling the length of time that said heating element is turned on.

10. The apparatus of claim 9, further comprising a handle being connected to said food cage to permit a user to move the food cage up or down.

* * * * *